(12) United States Patent
Tada et al.

(10) Patent No.: US 10,304,602 B2
(45) Date of Patent: May 28, 2019

(54) MNZN-BASED FERRITE AND METHOD FOR MANUFACTURING THE SAME

(71) Applicant: Hitachi Metals, Ltd., Tokyo (JP)

(72) Inventors: Tomoyuki Tada, Tokyo (JP); Yasuharu Miyoshi, Tokyo (JP); Norikazu Koyuhara, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 278 days.

(21) Appl. No.: 15/507,108

(22) PCT Filed: Aug. 31, 2015

(86) PCT No.: PCT/JP2015/074622
§ 371 (c)(1),
(2) Date: Feb. 27, 2017

(87) PCT Pub. No.: WO2016/032001
PCT Pub. Date: Mar. 3, 2016

(65) Prior Publication Data
US 2017/0278607 A1    Sep. 28, 2017

(30) Foreign Application Priority Data

Aug. 29, 2014 (JP) .................................. 2014-174996

(51) Int. Cl.
*C04B 35/26* (2006.01)
*C04B 35/64* (2006.01)
(Continued)

(52) U.S. Cl.
CPC .................. *H01F 1/34* (2013.01); *C01G 9/02* (2013.01); *C01G 45/02* (2013.01); *C01G 49/06* (2013.01);
(Continued)

(58) Field of Classification Search
CPC ..... H01F 1/344; C04B 35/64; C04B 35/2658; C04B 2235/3208; C04B 2235/3232;
(Continued)

(56) References Cited

U.S. PATENT DOCUMENTS 5,846,448 A * 12/1998 Yasuhara ............. C01G 49/009
252/62.56
7,294,284 B2 * 11/2007 Fukuchi ............... C01G 53/006
252/62.62
(Continued)

FOREIGN PATENT DOCUMENTS

JP    06-140231        5/1994
JP    2001-220146 A    8/2001
(Continued)

OTHER PUBLICATIONS

Extended European Search Report, dated May 4, 2018, of the corresponding European Application No. 15835796.2.
(Continued)

*Primary Examiner* — C Melissa Koslow
(74) *Attorney, Agent, or Firm* — Bret E. Field; Bozicevic, Field & Francis LLP (57) ABSTRACT

Provided are: a MnZn-based ferrite which allows to have a low magnetic core loss and to suppress a time-dependent change of magnetic property under a high-temperature environment by a control of ambient oxygen concentration and an increase of the magnetic core loss, and a method for manufacturing the same. The MnZn-based ferrite is characterized in that Fe ranges from 53.25 mol % or more to 54.00 mol % or less on the basis of $Fe_2O_3$, Zn ranges from 2.50 mol % or more to 8.50 mol % or less on the basis of ZnO and Mn is the remainder on the basis of MnO, Si ranges from more than 0.001 mass % to less than 0.02 mass % on the basis of $SiO_2$, Ca ranges from more than 0.04 mass % to less than 0.4 mass % on the basis of $CaCO_3$, Co is less than 0.5
(Continued)

mass % on the basis of $Co_3O_4$, Bi is less than 0.05 mass % on the basis of $Bi_2O_3$, Ta is less than 0.05 mass % on the basis of $Ta_2O_5$, Nb is less than 0.05 mass % on the basis of $Nb_2O_5$, Ti is less than 0.3 mass % on the basis of $TiO_2$, and Sn is less than 0.3 mass % on the basis of $SnO_2$, and note that the converted total amount of $Ta_2O_5$ and $Nb_2O_5$ is less than 0.05 mass % and the converted total amount of $TiO_2$ and $SnO_2$ is less than 0.3 mass %.

7 Claims, 3 Drawing Sheets

(51) Int. Cl.
  *C01G 9/02* (2006.01)
  *H01F 1/34* (2006.01)
  *C01G 45/02* (2006.01)
  *C01G 49/06* (2006.01)
(52) U.S. Cl.
  CPC .......... *C04B 35/2658* (2013.01); *C04B 35/64* (2013.01); *H01F 1/344* (2013.01); *C04B 2235/3208* (2013.01); *C04B 2235/3232* (2013.01); *C04B 2235/3251* (2013.01); *C04B 2235/3267* (2013.01); *C04B 2235/3272* (2013.01); *C04B 2235/3277* (2013.01); *C04B 2235/3284* (2013.01); *C04B 2235/3293* (2013.01); *C04B 2235/3298* (2013.01); *C04B 2235/6584* (2013.01)

(58) Field of Classification Search
  CPC .... C04B 2235/6584; C04B 2235/3251; C04B 2235/3293; C04B 2235/3277; C04B 2235/3298; C04B 2235/3272; C04B 2235/3284; C04B 2235/3267
  See application file for complete search history.

(56) References Cited

U.S. PATENT DOCUMENTS

| | | |
|---|---|---|
| 2004/0090302 A1 | 5/2004 | Sezai et al. |
| 2009/0242827 A1 | 10/2009 | Nakahata et al. |

FOREIGN PATENT DOCUMENTS

| | | |
|---|---|---|
| JP | 2004-292303 A | 10/2004 |
| JP | 2007-031240 A | 2/2007 |
| JP | 2007-051052 A | 3/2007 |
| JP | 2007-070209 A | 3/2007 |
| JP | 2007150006 | 6/2007 |
| JP | 2008-169072 A | 7/2008 |
| JP | 2009-227554 A | 10/2009 |

OTHER PUBLICATIONS

English Translation of International Search Report dated Nov. 2, 2015, for International Application No. PCT/JP2015/074622, 2 pages.

* cited by examiner

F I G. 1

F I G. 2

F I G. 3

MNZN-BASED FERRITE AND METHOD FOR MANUFACTURING THE SAME

CROSS-REFERENCE TO RELATED APPLICATIONS

This application is the national phase under 35 U.S.C. § 371 of PCT International Application No. PCT/JP2015/074622 which has an International filing date of Aug. 31, 2015 and designated the United States of America.

FIELD

The present invention relates to a MnZn-based ferrite used in an electronic component such as a transformer, an inductor, a reactor or a choke coil which is used for various kinds of power supply devices, and a method for manufacturing the MnZn-based ferrite.

BACKGROUND

A device such as a high-power electric motor, a charger is disposed in an electric vehicle that is one of electric transportation equipment such an EV (Electric Vehicle), a PHEV (Plug-in Hybrid Electric Vehicle) which spreads rapidly in recent years, and such a device is provided with an electronic component which withstands a high voltage and a large current. The electronic component includes a coil and a magnetic core as a basic configuration, and the magnetic core is comprised of a magnetic material such as a MnZn-based ferrite.

In such an application, various mechanical and electric loading conditions occur in the electronic component during running, and a used environmental temperature is also various. In the electronic component used in a consumer-electronics device, a MnZn-based ferrite is used whose composition is designed so that a minimum temperature of a magnetic core loss (also called a power loss) is 100° C. or lower for example, however, it is often the case that the MnZn-based ferrite is used that has the minimum temperature of the magnetic core loss Pcv reaching a high temperature over 100° C., based on the assumption that the MnZn-based ferrite is used under the high-temperature environment for on-vehicle use. Moreover, a low magnetic core loss is required in a wide temperature range.

Generally, the magnetic core loss Pcv of the ferrite consists of a hysteresis loss Ph, an eddy current loss Pe and a residual loss Pr. The hysteresis loss Ph increases in proportion to a frequency due to a direct-current hysteresis, and the eddy current loss Pe increases in proportion to the square of a frequency due to an electromotive force which is generated by an eddy current occurring according to an electromagnetic induction action. The residual loss Pr is the remaining loss which is related to a factor such as a domain wall resonance, and is revealed on a frequency of 500 kHz or more. That is, the hysteresis loss Ph, the eddy current loss Pe and the residual loss Pr change depending on a frequency, and a ratio thereof accounting for the whole magnetic core loss also changes depending on a frequency band.

The magnetic core loss of the MnZn-based ferrite has a temperature dependence, has the low hysteresis loss at a temperature where a crystal magnetic anisotropy constant K1 is zero, and has a minimum value at that temperature. An initial permeability pi is the maximum at that temperature, therefore, it is also called the secondary peak of the initial permeability pi. Since the magnetic core loss has a minimum value concerning the temperature, usually, a temperature at which the magnetic core loss is the minimum is adjusted with the crystal magnetic anisotropy constant K1 in anticipation of the generation of heat by the magnetic core loss, and the temperature is set to a temperature slightly higher than an environmental temperature to which the electronic component is exposed, which prevents the ferrite from losing magnetism due to thermal run-away.

The temperature at which the magnetic core loss is the minimum, i.e., the temperature at which the crystal magnetic anisotropy constant K1 is zero, can be changed according to the sum obtained by appropriately adjusting an amount of a metal ion having a positive crystal magnetic anisotropy constant K1 and an amount of a metal ion having a negative crystal magnetic anisotropy constant K1 among metal ions mainly constituting spinel in the MnZn-based ferrite. For the metal ions constituting spinel, the metal ions having the positive K1 are $Fe^{2+}$ and $Co^{2+}$ and the like and the metal ions having the negative K1 are $Fe^{3+}$, $Mn^{2+}$, $Ni^{2+}$, and the like. Although the change of the temperature at which the magnetic core loss is the minimum can be comparatively easy by adjusting the metal ions such as $Fe^{2+}$, $Fe^{3+}$, $Zn^{2+}$, and $Mn^{2+}$, it is difficult to improve the temperature dependence of the magnetic core loss based on such a process only. Thus, $Co^{2+}$ is employed that has a crystal magnetic anisotropy constant and a magnetostriction constant adequately larger than those of $Fe^{2+}$, which improves the temperature dependence of the magnetic core loss.

Japanese Patent Laid-Open Publication No. 2001-220146 discloses a MnZn-based ferrite which contains $Fe_2O_3$: 52.0-55.0 mol %, MnO: 32.0-44.0 mol % and ZnO: 4.0-14.0 mol % as a main component and contains CaO: 200-1000 ppm, $SiO_2$: 50-200 ppm, $Bi_2O_3$: 500 ppm or less, $Ta_2O_5$: 200-800 ppm and CoO: 4000 ppm or less as a sub component. In the MnZn-based ferrite disclosed in Japanese Patent Laid-Open Publication No. 2001-220146, the balance of the metal ions is adjusted with a composition amount of $Fe_2O_3$, CoO, ZnO, MnO, etc., and the temperature at which the magnetic core loss is the minimum is changed, which improves the temperature dependence of the magnetic core loss, while $Bi_2O_3$ is added to obtain a MnZn-based ferrite whose magnetic core loss is low in a wider temperature range.

Such an employment of $Co^{2+}$ is effective in the improvement of the temperature dependence of the magnetic core loss. However, the divalent metal ion such as $Fe^{2+}$ and $Co^{2+}$ is easy to move via a lattice defect to cause the increase of magnetic anisotropy, and also time-dependent change of a magnetic property such as the increase of the magnetic core loss and the decline of a magnetic permeability. Especially, it is known that the MnZn-based ferrite containing Co has such a marked tendency and the time-dependent change is accelerated under the high-temperature environment. Accordingly, the MnZn-based ferrite used for an electronic component which is easy to be exposed to a high temperature is required to further lower the magnetic core loss and to suppress control the time-dependent change of the magnetic property.

As a method of suppressing the time-dependent change of the magnetic property of the MnZn-based ferrite, Japanese Patent Laid-Open Publication No. 2004-292303 and Japanese Patent Laid-Open Publication No. 2007-70209 disclose to control an ambient oxygen concentration in calcination. The calcination includes a temperature rising step, a high temperature maintaining step and a temperature falling step as a basic process, and in Japanese Patent Laid-Open Publication No. 2004-292303 and Japanese Patent Laid-Open Publication No. 2007-70209 the ambient oxygen concentration is strictly controlled at the high temperature maintaining step and the temperature falling step especially.

SUMMARY

Although Japanese Patent Laid-Open Publication No. 2001-220146 does not describe the time-dependent change of the magnetic property, according to the present inventors' study, it is revealed that in a case of the composition containing Bi like the MnZn-based ferrite described in Japanese Patent Laid-Open Publication No. 2001-220146, there is a case where the ambient oxygen concentration is controlled so as to suppress the time-dependent change of the magnetic property, thereby causing the increase of the magnetic core loss.

Accordingly, an object of the present invention is to provide a MnZn-based ferrite which allows to have a low magnetic core loss and to suppress the time-dependent change of the magnetic property under the high-temperature environment and the increase of the magnetic core loss, and a method for manufacturing the same.

A first aspect is a MnZn-based ferrite containing Fe, Mn and Zn as a main component and containing Si, Ca, Co and Bi, and at least one of Ta and Nb, and at least one of Ti and Sn as a sub component, wherein given that a total amount is 100 mol % when the main component includes $Fe_2O_3$, ZnO and MnO respectively, Fe ranges from 53.25 mol % or more to 54.00 mol % or less on the basis of $Fe_2O_3$, Zn ranges from 2.50 mol % or more to 8.50 mol % or less on the basis of ZnO and Mn is the remainder on the basis of MnO, and Si ranges from more than 0.001 mass % to less than 0.02 mass % on the basis of $SiO_2$, Ca ranges from more than 0.04 mass % to less than 0.4 mass % on the basis of $CaCO_3$, Co is less than 0.5 mass % (zero is not contained) on the basis of $Co_3O_4$, Bi is less than 0.05 mass % (zero is not contained) on the basis of $Bi_2O_3$, Ta is less than 0.05 mass % (zero is contained) on the basis of $Ta_2O_5$, Nb is less than 0.05 mass % (zero is contained) on the basis of $Nb_2O_5$, Ti is less than 0.3 mass % (zero is contained) on the basis of $TiO_2$, and Sn is less than 0.3 mass % (zero is contained) on the basis of $SnO_2$, and note that the converted total amount of $Ta_2O_5$ and $Nb_2O_5$ is less than 0.05 mass % (zero is not contained) and the converted total amount of $TiO_2$ and $SnO_2$ is less than 0.3 mass % (zero is not contained), and at a frequency of 100 kHz in a maximum magnetic flux density of 200 mT, a magnetic core loss (Pcv130A) at 130° C. is 400 kW/m³ or less, and a rate of change Ps of the magnetic core loss is 5% or less that is expressed in the following formula using the magnetic core loss (Pcv130B) at 130° C. after maintaining the MnZn-based ferrite at 200° C. for 96 hours.

$$Ps\ (\%)=[(Pcv130B-Pcv130A)/Pcv130A]\times 100$$

In the first aspect, it is preferred that Si ranges from 0.003 mass % or more to 0.015 mass % or less on the basis of $SiO_2$, Ca ranges from 0.06 mass % or more to 0.3 mass % or less on the basis of $CaCO_3$, Co ranges from 0.16 mass % or more to 0.4 mass % or less on the basis of $Co_3O_4$, and Bi ranges from 0.0075 mass % or more to 0.04 mass % or less on the basis of $Bi_2O_3$, and in a case where Ta or Nb is contained independently, Ta ranges from 0.015 mass % or more to 0.04 mass % or less on the basis of $Ta_2O_5$ or Nb ranges from 0.015 mass % or more to 0.04 mass % or less on the basis of $Nb_2O_5$, and in a case where Ti or Sn is contained independently, Ti ranges from 0.02 mass % or more to 0.2 mass % or less on the basis of $TiO_2$ or Sn ranges from 0.02 mass % or more to 0.2 mass % or less on the basis of $SnO_2$, and in a case where both of Ta and Nb are contained, the converted total amount of $Ta_2O_5$ and $Nb_2O_5$ ranges from 0.015 mass % or more to 0.04 mass % or less, and in a case where both of Ti and Sn are contained, the converted total amount of $TiO_2$ and $SnO_2$ ranges from 0.02 mass % or more to 0.2 mass % or less.

In the MnZn-based ferrite of the first aspect, it is preferred that the magnetic core loss between 100° C. and 150° C. is 500 kW/m³ or less and the minimum temperature of the magnetic core loss ranges from 110° C. to 150° C.

In the MnZn-based ferrite of the first aspect, it is preferred that the magnetic core loss (Pcv130B) at 130° C. after maintaining the MnZn-based ferrite at 200° C. for 96 hours is 400 kW/m³ or less.

A second aspect is a method for manufacturing a MnZn-based ferrite, comprising a calcination step of molding an oxide powder of the main component and the sub component specified in the first aspect to obtain a molded body and calcinating the molded body, wherein the calcination step includes a temperature rising step, a high temperature maintaining step and a temperature falling step, and a temperature at the high temperature maintaining step ranges from 1250° C. to 1400° C., and an oxygen concentration in an atmosphere at the high temperature maintaining step is 0.7% or less in a volume percent, and an oxygen concentration at 1200° C. is 0.5% or less and an oxygen concentration at 1100° C. is 0.1% or less at the temperature falling step.

According to the present invention, the present invention can provide a MnZn-based ferrite which allows to have a low magnetic core loss and to suppress the time-dependent change of the magnetic property under the high-temperature environment and the increase of the magnetic core loss, and a method for manufacturing the same.

The above and further objects and features will more fully be apparent from the following detailed description with accompanying drawings.

DETAILED DESCRIPTION

The following description specifically explains a MnZn-based ferrite according to one embodiment of the present invention, a magnetic core with the same, and a method for manufacturing the same. Note that the present invention is not limited to this and can be appropriately modified within a technical idea.

(Composition of MnZn-Based Ferrite)

In order to reduce a magnetic core loss Pcv at a desired temperature, it is required to optimize a composition and to appropriately adjust an amount of a metal ion having a positive crystal magnetic anisotropy constant K1 and an amount of a metal ion having a negative crystal magnetic anisotropy constant K1, the metal ions constituting spinel. However, there is little degree of a freedom of the composition selection due to the restriction of the required magnetic property such as a saturation magnetic flux density Bs, a curie temperature Tc, an initial magnetic permeability pi other than the magnetic core loss Pcv. In a composition containing much $Fe_2O_3$, a magnetization curve obtained by applying an external magnetic field is narrow near the origin, and becomes a so-called perminvar type easily, and the magnetic core loss increases. Then, from the above viewpoint, in the present invention, a composition range is selected that as a main component $Fe_2O_3$ ranges from 53.25 mol % or more to 54.00 mol % or less, ZnO ranges from 2.50 mol % or more to 8.50 mol % or less and MnO is the remainder in a manner such that the minimum temperature of the magnetic core loss ranges from 110° C. to 150° C. Note that in the present invention, the main component means an element or a compound mainly constituting a spinel ferrite, while the sub component means an element or a compound subsidiarily used for the formation and a part thereof contains an element which dissolves to the spinel ferrite. Moreover, the sub component further contains an element constituting the spinel ferrite like Co because a content thereof is low as compared with that of the main component.

In the MnZn-based ferrite of the present invention, the MnZn-based ferrite contains Fe, Mn and Zn as the main component and contains Si, Ca, Co and Bi, and at least one of Ta and Nb, and at least one of Ti and Sn as the sub component.

In the MnZn-based ferrite of the present invention, Si and Ca are contained in a predetermined range, Si and Ca of a high resistance are present in a grain boundary of a ferrite sintered body (for example, a magnetic core) obtained by calcinating the MnZn-based ferrite, and then a crystal grain is insulated to exert an effect such as the increase of a volume resistivity $\rho$ and the reduction of a relative loss factor tan $\delta/\mu i$. In the present invention, Si is contained that ranges from more than 0.001 mass % to less than 0.02 mass % on the basis of $SiO_2$, and Ca is contained that ranges from more than 0.04 mass % to less than 0.4 mass % on the basis of $CaCO_3$. More preferably, Si is contained that ranges from 0.003 mass % or more to 0.015 mass % or less on the basis of $SiO_2$, and Ca is contained that ranges from 0.06 mass % or more to 0.3 mass % or less on the basis of $CaCO_3$. Furthermore preferably, Ca is contained that ranges from more than 0.06 mass % to 0.3 mass % or less on the basis of $CaCO_3$.

Although Si is entirely segregated in the grain boundary and its triple point, there is a case where Ca dissolves to a spinel phase in the middle of the calcination step, and a part thereof dissolves and remains in the crystal grain even after the calcination step. When Ca which dissolves to the spinel phase increases, it is possible that the resistance in the crystal grain is increased and the volume resistivity $\rho$ is increased, but Ca in the gain boundary decreases relatively. In order to obtain the high volume resistivity $\rho$ so as to achieve a MnZn-based ferrite whose loss is low, it is effective that Ca which dissolves to the spinel phase and Ca which is segregated to the grain boundary are appropriately adjusted to increase the resistance in the crystal grain and to form the grain boundary of a high resistance. Such an adjustment can be performed with the later-described calcination temperature and the calcination atmosphere control.

By further adding $Co^{2+}$ in addition to $Fe^{2+}$, it is possible that the temperature change of the loss is reduced, the loss is low in a wide temperature range, and a relative temperature coefficient $\alpha\mu ir$ is reduced. Moreover, by adding $Co^{2+}$, a residual magnetic flux density Br can be reduced, which can further reduce the hysteresis loss Ph. However, such an effect by $Co^{2+}$ may cause the magnetic core loss to deteriorate because in a case where the content of Co is excessive, the magnetization curve becomes the perminvar type easily and the crystal magnetic anisotropy constant becomes too high toward a positive side on a low temperature side. For this reason, in the present invention, Co to be added is set to be less than 0.5 mass % (zero is not contained) on the basis of $Co_3O_4$. More preferably, Co is contained that ranges from 0.16 mass % or more to 0.4 mass % or less on the basis of $Co_3O_4$. Furthermore preferably, Co is contained that ranges from 0.16 mass % or more to less than 0.4 mass % on the basis of $Co_3O_4$.

Bi is entirely segregated in the grain boundary and its triple point and contributes to the forming of the grain boundary of a high resistance. Bi also functions as a sintering accelerator and densifies a crystal structure. A crystal grain size increases, the hysteresis loss decreases, and the magnetic core loss is reduced. Bi of less than 0.05 mass % (zero is not contained) on the basis of $Bi_2O_3$ is contained. Much Bi causes an abnormal sintering to increase the magnetic core loss. Preferably, Bi is contained that ranges from 0.0075 mass % or more to 0.04 mass % or less on the basis of $Bi_2O_3$. More preferably, Bi is contained that ranges from 0.01 mass % or more to less than 0.04 mass % on the basis of $Bi_2O_3$.

Ta and Nb are Group Va elements, and these components appear in a grain boundary layer with Si and Ca, increase a resistance of the grain boundary layer, and then contributes to the reduction of the loss. Ta or Nb may be contained independently, or both of them may be contained. It is preferred that in a case where Ta or Nb is contained independently, Ta or Nb of less than 0.05 mass % on the basis of $Ta_2O_5$ or $Nb_2O_5$ is contained and in a case where both of Ta and Nb are contained, a converted total amount of $Ta_2O_5$ and $Nb_2O_5$ is less than 0.05 mass % (zero is not contained). More preferably, in a case where Ta or Nb is contained independently, Ta or Nb is contained that ranges from 0.015 mass % or more to 0.04 mass % or less on the basis of $Ta_2O_5$ or $Nb_2O_5$ and in a case where both of Ta and Nb are contained, a total amount of $Ta_2O_5$ and $Nb_2O_5$ ranges from 0.015 mass % or more to 0.04 mass % or less. In a case where Nb is contained independently, more preferably, Nb is contained that ranges from 0.015 mass % or more to less than 0.04 mass % on the basis of $Nb_2O_5$. Once the amount of Ta and/or Nb exceeds a predetermined amount, the magnetic core loss increases, and when the amount of Ta and/or Nb does not reach the predetermined amount, the effect of reducing the magnetic core loss is hard to be acquired.

Moreover, in the present invention, at least one of Ti and Sn is contained as the sub component, which can further improve the magnetic core loss as a synergistic effect with the other sub component including Bi and also suppress the time-dependent change of the magnetic property under the high-temperature environment. Sn and Ti are tetravalent stable metal ions, dissolve in the crystal grain, and increase the volume resistivity $\rho$ so as to reduce the magnetic core loss Pcv. Note that Ti and Sn are entirely present in the crystal grain, but a part thereof may be present in the grain boundary. In a case where Ti or Sn is contained independently, it is preferred that Ti of less than 0.3 mass % on the basis of $TiO_2$ is contained and Sn of less than 0.3 mass % on the basis of $SnO_2$ is contained. In a case where both of Ti and Sn are contained, it is preferred that a converted total amount of $TiO_2$ and $SnO_2$ is less than 0.3 mass % (zero is not contained). More preferably, in a case where Ti or Sn is contained independently, Ti or Sn is contained that ranges from 0.02 mass % or more to 0.2 mass % or less on the basis of $TiO_2$ or $SnO_2$ and even in a case where both of Ti and Sn are contained, a total amount of $TiO_2$ and $SnO_2$ ranges from 0.02 mass % or more to 0.2 mass % or less. Once the amount of Ti and/or Sn exceeds a preferred composition amount is exceeded, there is a case where an abnormal gain growth easily occurs to cause the power loss to deteriorate and to reduce the saturation magnetic flux density.

Sulfur S, chlorine Cl, phosphorus P, boron B etc. may be contained as impurities in a raw material which constitutes the MnZn-based ferrite. In the present invention, these impurities are not specified especially, but it is known experientially that the reduction of the impurities achieves the reduction of the magnetic core loss and the improvement in the magnetic permeability. Especially concerning S, there is a case where a compound with Ca is generated, and is segregated in the grain boundary as a foreign substance to reduce the volume resistivity ρ and to increase the eddy current loss. For this reason, in order to further reduce the magnetic core loss, it is preferred that impurities are reduced and preferably S is set to be 0.03 mass % or less, Cl is set to be 0.01 mass % or less, P is set to 0.001 mass % or less and B is set to be 0.0001 mass % or less.

(Method for Manufacturing MnZn-Based Ferrite)

A raw material is weighted so that there is a predetermined composition amount as the MnZn-based ferrite, and then $Fe_2O_3$, MnO ($Mn_3O_4$ is used) and ZnO as the main component are temporally calcinated and cracked, and then $SiO_2$, $CaCO_3$, $Co_3O_4$ and $Bi_2O_3$, and $Ta_2O_5$ or $Nb_2O_5$, and $TiO_2$ or $SnO_2$ as the sub component are appropriately added and mixed, and a binder is added thereto and then the obtained composition is granulated and molded, and then is calcinated. In the present invention, the MnZn-based ferrite obtained after the calcination may be called a ferrite sintered body.

The calcination step includes the high temperature maintaining step of maintaining in a predetermined temperature range, the temperature rising step which is the preceding step of the high temperature maintaining step, and the temperature falling step which is the following step of the high temperature maintaining step, and it is preferred that the temperature rising step is performed in the atmosphere during reaching from a room temperature to any temperature ranging from 750° C. to 950, $N_2$ is substituted at any temperature ranging from 750° C. to 950° C., an oxygen concentration is controlled in a range of 0.2% to 0.7% at the high temperature maintaining step where any temperature ranging from 1250 to 1400° C. is set, and also the equilibrium oxygen partial pressure is changed to the $N_2$ atmosphere at the temperature falling step.

A rising rate at the temperature rising step may be appropriately selected according to a residual carbon state in a debinding and to a composition. Preferably the rising rate ranges from 50 to 200° C./hr. Moreover it is known that Ca is segregated to the grain boundary as the oxygen concentration is higher and Ca dissolves to the spinel phase at a high temperature over 1100° C. in the low oxygen partial pressure to the $N_2$ atmosphere. Then, in the present invention, it is preferred that the oxygen partial pressure is adjusted, which segregates Ca in the gain boundary while the dissolving of Ca into the crystal grain is appropriately controlled to reduce the magnetic core loss.

In order to increase the resistance of the grain boundary, the control of a temperature falling rate according to a composition is employed as a calcination condition, and preferably a falling rate from a high-temperature maintaining temperature to 1000° C. ranges from 50 to 150° C./hr, and a falling rate from 1000° C. to 900° C. ranges from 50 to 300° C./hr, and a falling rate from 900° C. to 600° C. ranges from 150 to 500° C./hr.

More preferably, the control at the temperature falling step is specified by the following formula which is a function of an oxygen concentration $PO_2$ (volume percent; %) and a temperature T (° C.).

$$\log(PO_2)=a-b/(T+273) \quad \text{Formula}$$

Note that a and b are constants and it is preferred that "a" ranges from 3.1 to 12.8 and "b" ranges from 6000 to 20000. "a" is specified from a temperature and an oxygen concentration at the high temperature maintaining step. Moreover, once "b" is smaller than a predetermined range, an oxygen concentration is high and the oxidization progresses even when a temperature falls, and hematite may deposit from spinel. Furthermore, once "b" is large, the oxygen concentration falls and wustite deposits, and then the crystal grain and the gain boundary layer are not adequately oxidized to reduce the resistance. More preferably, "a" ranges from 6.4 to 11.5 and "b" ranges from 10000 to 18000, and the oxygen concentration at the high temperature maintaining step is controlled to be 0.7% or less, the oxygen concentration at 1200° C. is controlled to be 0.5% or less and the oxygen concentration at 1100° C. is controlled to be 0.1% or less, which can further reduce the time-dependent change of the magnetic property under the high-temperature environment.

Although an average crystal grain size of the MnZn-based ferrite is appropriately set according to an used frequency of an electronic component utilizing the MnZn-based ferrite, it is preferred that the average crystal grain size is set to 5 μm or less for a high frequency use of 500 kHz or more to reduce the eddy current loss, while the crystal grain is refined to subdivide a magnetic domain so as to reduce the loss due to the domain wall resonance, and it is preferred that the average crystal grain size is set to be more than 5 μm and 30 μm or less for a frequency use of less than 500 kHz to reduce a coercive force Hc so as to reduce the hysteresis loss.

EXAMPLE 1

The following description explains the present invention more in detail with specific examples. A raw material was weighed so that there was a composition that amounts of $Bi_2O_3$ and $TiO_2$ shown in Table 1 as the MnZn-based ferrite were different from each other. $Fe_2O_3$, MnO ($Mn_3O_4$ is used) and ZnO were used as a raw material of the main component, and wet-mixed and then dried and temporally calcinated at 900° C. for 3 hours. Subsequently, a temporally calcinated powder as well as $SiO_2$, $CaCO_3$, $Co_3O_4$, $Ta_2O_5$, $Bi_2O_3$ and $TiO_2$ were added to a ball mill, and were ground and mixed until an average grinding grain size was 1.2 to 1.5 μm. Polyvinyl alcohol was added to the obtained mixture as a binder and was granulated with a spray drier, and then was molded to a predetermined shape to obtain a ring-shaped molded body, and the molded body was calcinated to obtain a magnetic core (a ferrite sintered body) with an outer diameter of φ25 mm×an inner diameter of φ15 mm×a thickness of 5 mm. In the following, an example where "*" is affixed to No. indicates a comparative example with the inclusion of Table 1.

Figure 1:
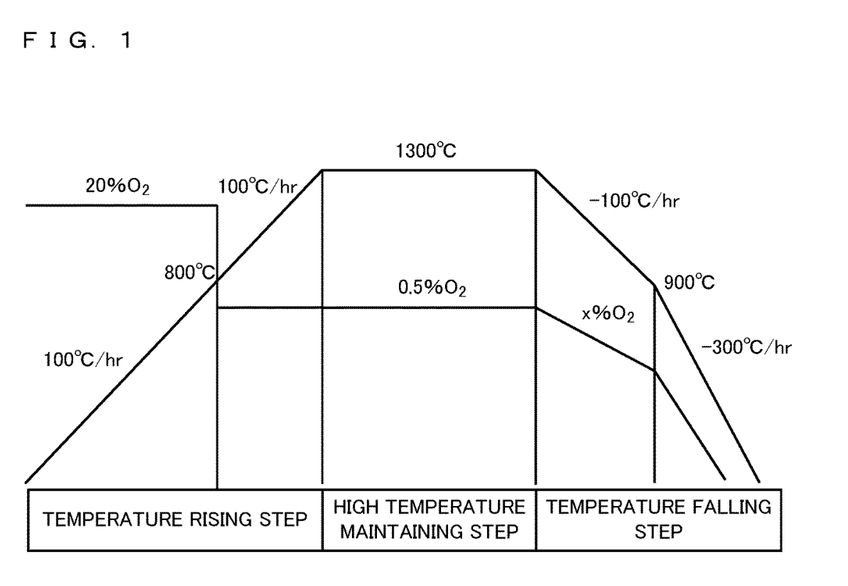
FIG. 1 is a view showing a temperature condition of a calcination step according to one embodiment of the present invention.

FIG. 1 indicates a temperature condition of the calcination step. The calcination step was performed in the atmosphere at the temperature rising step during reaching from a room temperature to 800° C., and $N_2$ was substituted at the temperature. At the high temperature maintaining step where 1300° C. was set, the oxygen concentration was set to be a value shown in the column of the $O_2$ concentration of Table 1, and a maintaining time was set to 4 hours. At the temperature falling step during reaching from 1300° C. (high-temperature maintaining temperature) to 900° C. at the equilibrium oxygen partial pressure, the falling rate was set to 100° C./hr, and the falling rate was set to 300° C./hr after 900° C. or less.

TABLE 1

| No. | Fe$_2$O$_3$ (mol %) | ZnO (mol %) | MnO (mol %) | Co$_3$O$_4$ (mass %) | SiO$_2$ (mass %) | CaCO$_3$ (mass %) | Ta$_2$O$_5$ (mass %) | Nb$_2$O$_5$ (mass %) | Bi$_2$O$_3$ (mass %) | TiO$_2$ (mass %) | SnO$_2$ (mass %) | O$_2$ concentration (%) |
|---|---|---|---|---|---|---|---|---|---|---|---|---|
| *1 | 53.65 | 4.5 | 41.85 | 0.3 | 0.006 | 0.12 | 0.03 | 0 | 0 | 0 | 0 | 1 |
| *2 | 53.65 | 4.5 | 41.85 | 0.3 | 0.006 | 0.12 | 0.03 | 0 | 0 | 0 | 0 | 0.5 |
| *3 | 53.65 | 4.5 | 41.85 | 0.3 | 0.006 | 0.12 | 0.03 | 0 | 0.02 | 0 | 0 | 3 |
| *4 | 53.65 | 4.5 | 41.85 | 0.3 | 0.006 | 0.12 | 0.03 | 0 | 0.02 | 0 | 0 | 0.7 |
| *5 | 53.65 | 4.5 | 41.85 | 0.3 | 0.006 | 0.12 | 0.03 | 0 | 0.02 | 0 | 0 | 0.5 |
| *6 | 53.65 | 4.5 | 41.85 | 0.3 | 0.006 | 0.12 | 0.03 | 0 | 0.02 | 0 | 0 | 0.3 |
| *7 | 53.65 | 4.5 | 41.85 | 0.3 | 0.006 | 0.12 | 0.03 | 0 | 0.02 | 0 | 0 | 0.2 |
| *8 | 53.65 | 4.5 | 41.85 | 0.3 | 0.006 | 0.12 | 0.03 | 0 | 0 | 0.1 | 0 | 0.5 |
| 9 | 53.65 | 4.5 | 41.85 | 0.3 | 0.006 | 0.12 | 0.03 | 0 | 0.0075 | 0.1 | 0 | 0.5 |
| 10 | 53.65 | 4.5 | 41.85 | 0.3 | 0.006 | 0.12 | 0.03 | 0 | 0.01 | 0.1 | 0 | 0.5 |
| *11 | 53.65 | 4.5 | 41.85 | 0.3 | 0.006 | 0.12 | 0.03 | 0 | 0.02 | 0.1 | 0 | 1 |
| 12 | 53.65 | 4.5 | 41.85 | 0.3 | 0.006 | 0.12 | 0.03 | 0 | 0.02 | 0.1 | 0 | 0.5 |
| 13 | 53.65 | 4.5 | 41.85 | 0.3 | 0.006 | 0.12 | 0.03 | 0 | 0.04 | 0.1 | 0 | 0.5 |
| *14 | 53.65 | 4.5 | 41.85 | 0.3 | 0.006 | 0.12 | 0.03 | 0 | 0.05 | 0.1 | 0 | 0.5 |

About the obtained magnetic core, the magnetic core loss Pcv, the saturation magnetic flux density Bs, and the average crystal grain size were evaluated. An evaluation method is as follows.

(Magnetic Core Loss Pcv)

For the magnetic core loss Pcv, the B—H analyzer (SY-8232) manufactured by Iwatsu Electric Co., Ltd. was used, a primary winding and a secondary winding are wound around the magnetic core for 5 turns respectively, and the magnetic core loss was measured at a frequency of 100 kHz and a maximum magnetic flux density of 200 mT at a room temperature (23° C.) to 150° C.

The magnetic core was held in a high temperature bath in the atmosphere of 200° C. for 96 hours to leave it in the high-temperature environment, and then the magnetic core was retrieved from the high temperature bath and after a temperature of the magnetic core falls to the room temperature, the magnetic core was evaluated at 130° C. on the same conditions, and a rate of change Ps of the magnetic core loss was calculated with the following formula from the magnetic core losses at 130° C. before and after leaving it in the high-temperature environment.

$$Ps\ (\%) = [(Pcv130B - Pcv130A)/Pcv130A] \times 100$$

Note that Pcv130A is the magnetic core loss at 130° C. before leaving the magnetic core in the high-temperature environment, and Pcv130B is the magnetic core loss at 130° C. after leaving the magnetic core in the high-temperature environment. Note that in the measurement of the magnetic core loss before leaving the magnetic core in the high-temperature environment, the magnetic core was placed in a constant temperature bath adjusted in the atmosphere of up to 150° C. for about 10 minutes to 15 minutes for stabilizing the temperature of the magnetic core, but the time-dependent change of the magnetic property did not substantially occur with the inclusion of magnetic cores of the following Examples.

(Saturation Magnetic Flux Density Bs)

For a saturation magnetic flux density (Bs), a primary winding and a secondary winding were wound around the magnetic core for 40 turns respectively, a magnetic field of 1.2 kA/m was applied to the magnetic core and the saturation magnetic flux density (Bs) was measured at 130° C. using the direct-current magnetization measurement test equipment (manufactured by the METRON Inc., SK-110 type).

(Average Crystal Grain Size)

For an average crystal grain size, a grain boundary was thermally etched in a mirror polished surface of a ferrite sintered body (1100° C.×1 hr; processing in N$_2$) and the surface was photographed with an optical microscope by 400 times, and then the average crystal grain size was calculated in a rectangular area of 140 μm×105 μm on this picture with a quadrature.

Table 2 indicates the evaluated results of the magnetic core loss Pcv, the saturation magnetic flux density Bs and the average crystal grain size. Note that "–" means not-evaluated in the average crystal grain size.

TABLE 2

| | magnetic core loss Pcv(kW/m$^3$) | | | | minimum temperature of magnetic core loss | magnetic core loss at 130° C. after left in high-temperature environment | rate of change Ps of magnetic core loss | saturation magnetic flux density Bs at 130° C. | average crystal grain size |
|---|---|---|---|---|---|---|---|---|---|
| No. | 23° C. | 100° C. | 130° C. | 150° C. | (° C.) | (kW/m$^3$) | (%) | (mT) | (μm) |
| *1 | 671 | 432 | 384 | 440 | 130 | 443 | 15.4 | 410 | 12.1 |
| *2 | 710 | 476 | 420 | 488 | 130 | 431 | 2.6 | 413 | — |
| *3 | 804 | 523 | 452 | 514 | 130 | 585 | 29.4 | 404 | — |
| *4 | 697 | 444 | 385 | 436 | 130 | 414 | 7.5 | 412 | — |
| *5 | 702 | 447 | 403 | 475 | 130 | 413 | 2.5 | 415 | — |
| *6 | 761 | 479 | 433 | 501 | 130 | 438 | 1.2 | 415 | — |
| *7 | 897 | 601 | 543 | 635 | 130 | 545 | 0.4 | 414 | — |
| *8 | 734 | 462 | 408 | 479 | 130 | 419 | 2.7 | 414 | 12.0 |
| 9 | 715 | 405 | 357 | 420 | 130 | 365 | 2.2 | 414 | — |
| 10 | 707 | 399 | 355 | 413 | 130 | 362 | 2.0 | 414 | 12.8 |
| *11 | 655 | 378 | 336 | 389 | 130 | 391 | 16.4 | 411 | — |
| 12 | 683 | 384 | 348 | 400 | 130 | 356 | 2.2 | 415 | 13.0 |

TABLE 2-continued

| | magnetic core loss Pcv(kW/m³) | | | | minimum temperature of magnetic core loss | magnetic core loss at 130° C. after left in high-temperature environment | rate of change Ps of magnetic core loss | saturation magnetic flux density Bs at 130° C. | average crystal grain size |
|---|---|---|---|---|---|---|---|---|---|
| No. | 23° C. | 100° C. | 130° C. | 150° C. | (° C.) | (kW/m³) | (%) | (mT) | (μm) |
| 13 | 689 | 421 | 371 | 428 | 130 | 382 | 3.0 | 415 | 13.4 |
| *14 | 736 | 449 | 402 | 455 | 130 | 412 | 2.5 | 413 | 14.3 |

Figure 2:
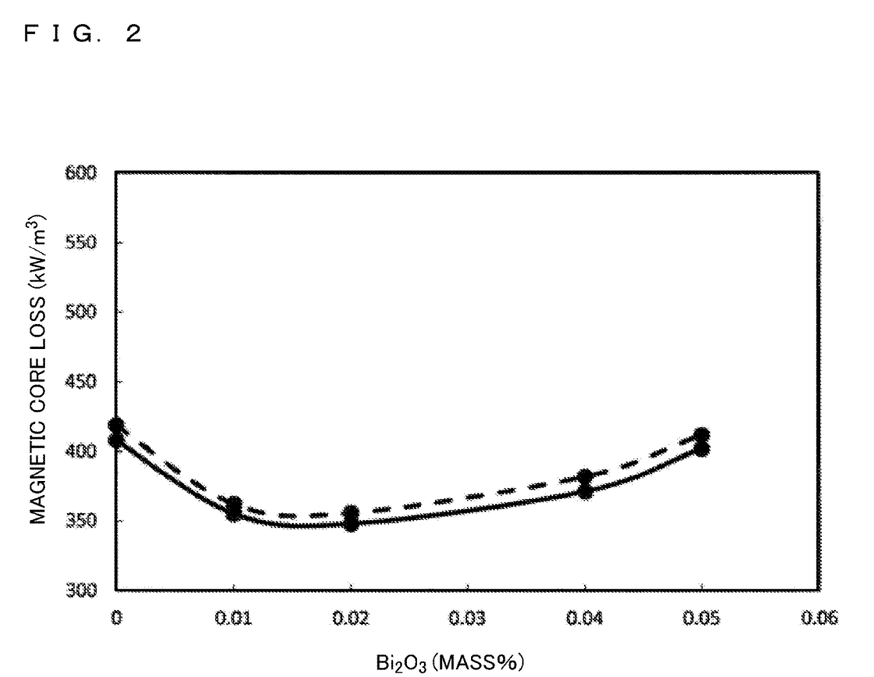
FIG. 2 is a view showing the relation between an amount of $Bi_2O_3$ of a MnZn-based ferrite and magnetic core losses before and after maintaining at a high temperature.

Each of the magnetic core losses of the MnZn-based ferrites of Example shown in No. 9, No. 10, No. 12 and No. 13 was low, and the magnetic core loss at 130° C. before leaving the MnZn-based ferrite in the high-temperature environment was 380 kW/m³ or less, the magnetic core loss (Pcv130B) after leaving the magnetic core in the high-temperature environment was 400 kW/m³ or less, the magnetic core loss from 100° C. to 150° C. was 430 kW/m³ or less, and a minimum temperature of the magnetic core loss ranged from 110° C. to 150° C. As shown in No. 11 and No. 12, the oxygen concentration is controlled so as to suppress the time-dependent change of the magnetic core loss, which further reduces a rate of increase of the magnetic core loss (Pcv130A) at 130° C. as compared with the comparative example. FIG. 2 shows the magnetic core losses before and after leaving the MnZn-based ferrites shown in No. 8, No. 10 and No. 12-14. In FIG. 2, a solid line represents the magnetic core loss before leaving them in the high-temperature environment, and a dashed line represents the magnetic core loss after leaving them in the high-temperature environment. The magnetic core loss turns out to be the minimum to the amount of $Bi_2O_3$.

EXAMPLE 2

A raw material was weighed so that there was a composition that amounts of $TiO_2$ and $SnO_2$ shown in Table 3 as the MnZn-based ferrite were different from each other. The other step conditions are the same as Example 1, therefore, the explanation thereof is omitted.

TABLE 3

| No. | $Fe_2O_3$ (mol %) | ZnO (mol %) | MnO (mol %) | $Co_3O_4$ (mass %) | $SiO_2$ (mass %) | $CaCO_3$ (mass %) | $Ta_2O_5$ (mass %) | $Nb_2O_5$ (mass %) | $Bi_2O_3$ (mass %) | $TiO_2$ (mass %) | $SnO_2$ (mass %) | $O_2$ concentration (%) |
|---|---|---|---|---|---|---|---|---|---|---|---|---|
| *5 | 53.65 | 4.5 | 41.85 | 0.3 | 0.006 | 0.12 | 0.03 | 0 | 0.02 | 0 | 0 | 0.5 |
| 15 | 53.65 | 4.5 | 41.85 | 0.3 | 0.006 | 0.12 | 0.03 | 0 | 0.02 | 0.02 | 0 | 0.5 |
| 16 | 53.65 | 4.5 | 41.85 | 0.3 | 0.006 | 0.12 | 0.03 | 0 | 0.02 | 0.05 | 0 | 0.5 |
| 17 | 53.65 | 4.5 | 41.85 | 0.3 | 0.006 | 0.12 | 0.03 | 0 | 0.02 | 0.1 | 0 | 0.5 |
| 18 | 53.65 | 4.5 | 41.85 | 0.3 | 0.006 | 0.12 | 0.03 | 0 | 0.02 | 0.2 | 0 | 0.5 |
| *19 | 53.65 | 4.5 | 41.85 | 0.3 | 0.006 | 0.12 | 0.03 | 0 | 0.02 | 0.3 | 0 | 0.5 |
| 20 | 53.65 | 4.5 | 41.85 | 0.3 | 0.006 | 0.12 | 0.03 | 0 | 0.02 | 0 | 0.02 | 0.5 |
| 21 | 53.65 | 4.5 | 41.85 | 0.3 | 0.006 | 0.12 | 0.03 | 0 | 0.02 | 0 | 0.05 | 0.5 |
| 22 | 53.65 | 4.5 | 41.85 | 0.3 | 0.006 | 0.12 | 0.03 | 0 | 0.02 | 0 | 0.1 | 0.5 |
| 23 | 53.65 | 4.5 | 41.85 | 0.3 | 0.006 | 0.12 | 0.03 | 0 | 0.02 | 0 | 0.2 | 0.5 |
| *24 | 53.65 | 4.5 | 41.85 | 0.3 | 0.006 | 0.12 | 0.03 | 0 | 0.02 | 0 | 0.3 | 0.5 |
| 25 | 53.65 | 4.5 | 41.85 | 0.3 | 0.006 | 0.12 | 0.03 | 0 | 0.02 | 0.1 | 0.05 | 0.5 |
| *26 | 53.65 | 4.5 | 41.85 | 0.3 | 0.006 | 0.12 | 0.03 | 0 | 0.02 | 0.15 | 0.15 | 0.5 |

About the obtained magnetic core, the magnetic core loss Pcv, the saturation magnetic flux density Bs, and the average crystal grain size were evaluated. The evaluation method is the same as Example 1, therefore, the explanation thereof is omitted. The result is shown in Table 4.

TABLE 4

| | magnetic core loss Pcv(kW/m³) | | | | minimum temperature of magnetic core loss | magnetic core loss at 130° C. after left in high-temperature environment | rate of change Ps of magnetic core loss | saturation magnetic flux density Bs at 130° C. | average crystal grain size |
|---|---|---|---|---|---|---|---|---|---|
| No. | 23° C. | 100° C. | 130° C. | 150° C. | (° C.) | (kW/m³) | (%) | (mT) | (μm) |
| *5 | 702 | 447 | 403 | 475 | 130 | 413 | 2.5 | 415 | — |
| 15 | 695 | 435 | 391 | 447 | 130 | 399 | 2.0 | 415 | — |
| 16 | 688 | 415 | 373 | 422 | 130 | 381 | 2.1 | 414 | — |
| 17 | 683 | 384 | 348 | 398 | 130 | 356 | 2.2 | 415 | 13.0 |
| 18 | 694 | 395 | 361 | 407 | 130 | 368 | 2.0 | 412 | — |
| *19 | 540 | 355 | 500 | 617 | 100 | 516 | 3.2 | 410 | — |
| 20 | 687 | 433 | 388 | 440 | 130 | 397 | 2.3 | 415 | — |
| 21 | 681 | 420 | 381 | 431 | 130 | 389 | 2.0 | 413 | — |
| 22 | 685 | 404 | 362 | 415 | 130 | 369 | 1.9 | 413 | — |
| 23 | 697 | 404 | 375 | 434 | 130 | 383 | 2.1 | 411 | — |

TABLE 4-continued

| | magnetic core loss Pcv(kW/m³) | | | | minimum temperature of magnetic core loss (° C.) | magnetic core loss at 130° C. after left in high-temperature environment (kW/m³) | rate of change Ps of magnetic core loss (%) | saturation magnetic flux density Bs at 130° C. (mT) | average crystal grain size (μm) |
|---|---|---|---|---|---|---|---|---|---|
| No. | 23° C. | 100° C. | 130° C. | 150° C. | | | | | |
| *24 | 666 | 375 | 453 | 560 | 130 | 467 | 3.1 | 407 | — |
| 25 | 688 | 411 | 367 | 426 | 130 | 375 | 2.2 | 411 | — |
| *26 | 623 | 389 | 434 | 538 | 100 | 445 | 2.5 | 407 | — |

Figure 3:
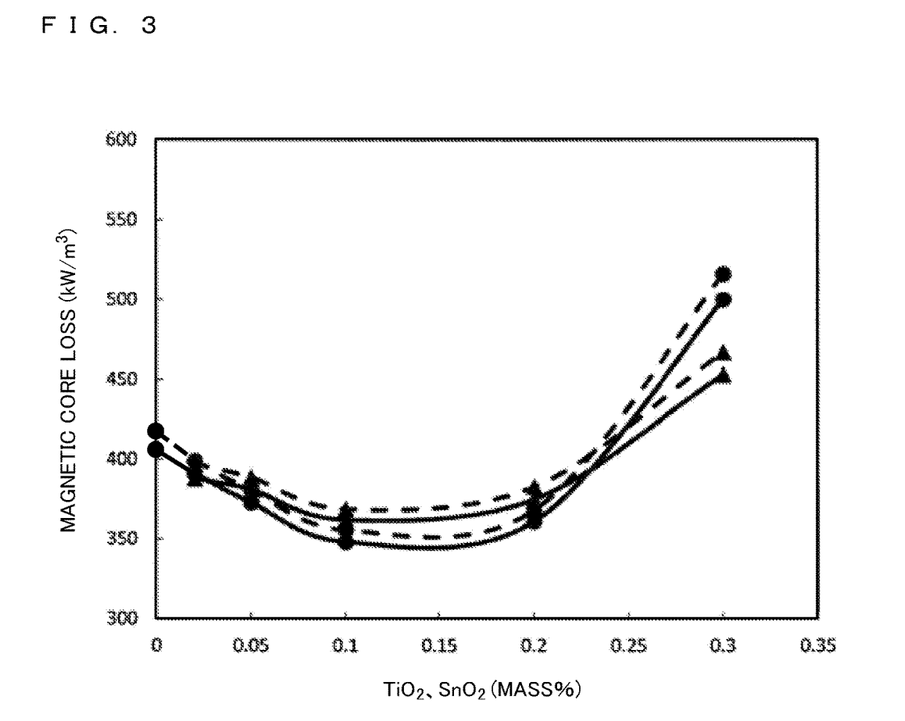
FIG. 3 is a view showing the relation between amounts of $TiO_2$ and $SnO_2$ of the MnZn-based ferrite and the magnetic core losses before and after maintaining at the high temperature.

Each of magnetic core losses of the MnZn-based ferrites of Example was low. FIG. 3 shows the magnetic core losses before and after leaving the MnZn-based ferrites shown in No. 5 and No. 15-24 in the high-temperature environment. In FIG. 3, a solid line of a circle represents the magnetic core loss before leaving in the high-temperature environment the MnZn-based ferrites shown in No. 5 and No. 15-19 whose $TiO_2$ amounts are changed, and a dashed line represents the magnetic core loss after leaving them in the high-temperature environment. Also, a solid line of a triangle represents the magnetic core loss before leaving in the high-temperature environment the MnZn-based ferrites shown in No. 20-24 whose $SnO_2$ amounts are changed, and a dashed line represents the magnetic core loss after leaving them in the high-temperature environment. The magnetic core loss turns out to be the minimum to the amounts of $TiO_2$ and $SnO_2$.

EXAMPLE 3

$Fe_2O_3$, MnO ($Mn_3O_4$ is used), ZnO, $SiO_2$, $CaCO_3$, $Co_3O_4$, $Ta_2O_5$, $Nb_2O_5$, $Bi_2O_3$ and $TiO_2$ were weighed so as to obtain a composition shown in Table 5 as the MnZn-based ferrite. The other step conditions are the same as Example 1, therefore, the explanation thereof is omitted.

TABLE 5

| No. | $Fe_2O_3$ (mol %) | ZnO (mol %) | MnO (mol %) | $Co_3O_4$ (mass %) | $SiO_2$ (mass %) | $CaCO_3$ (mass %) | $Ta_2O_5$ (mass %) | $Nb_2O_5$ (mass %) | $Bi_2O_3$ (mass %) | $TiO_2$ (mass %) | $SnO_2$ (mass %) | $O_2$ concentration (%) |
|---|---|---|---|---|---|---|---|---|---|---|---|---|
| 27 | 53.75 | 4.50 | 41.75 | 0.16 | 0.003 | 0.08 | 0.03 | 0 | 0.02 | 0.1 | 0 | 0.5 |
| 28 | 53.75 | 4.50 | 41.75 | 0.16 | 0.015 | 0.08 | 0.03 | 0 | 0.02 | 0.1 | 0 | 0.5 |
| *29 | 53.75 | 4.50 | 41.75 | 0.16 | 0.02 | 0.08 | 0.03 | 0 | 0.02 | 0.1 | 0 | 0.5 |
| *30 | 53.75 | 4.50 | 41.75 | 0.16 | 0.006 | 0.04 | 0.03 | 0 | 0.02 | 0.1 | 0 | 0.5 |
| 31 | 53.75 | 4.50 | 41.75 | 0.16 | 0.006 | 0.08 | 0.03 | 0 | 0.02 | 0.1 | 0 | 0.5 |
| 32 | 53.75 | 4.50 | 41.75 | 0.16 | 0.006 | 0.3 | 0.03 | 0 | 0.02 | 0.1 | 0 | 0.5 |
| *33 | 53.75 | 4.50 | 41.75 | 0.16 | 0.006 | 0.4 | 0.03 | 0 | 0.02 | 0.1 | 0 | 0.5 |
| *34 | 53.75 | 4.50 | 41.75 | 0 | 0.006 | 0.08 | 0.03 | 0 | 0.02 | 0.1 | 0 | 0.5 |
| 35 | 53.75 | 4.50 | 41.75 | 0.16 | 0.006 | 0.08 | 0.03 | 0 | 0.02 | 0.1 | 0 | 0.5 |
| 36 | 53.75 | 4.50 | 41.75 | 0.4 | 0.006 | 0.08 | 0.03 | 0 | 0.02 | 0.1 | 0 | 0.5 |
| *37 | 53.75 | 4.50 | 41.75 | 0.5 | 0.006 | 0.08 | 0.03 | 0 | 0.02 | 0.1 | 0 | 0.5 |
| *38 | 53.75 | 4.50 | 41.75 | 0.3 | 0.006 | 0.08 | 0 | 0 | 0.02 | 0.1 | 0 | 0.5 |
| 39 | 53.75 | 4.50 | 41.75 | 0.3 | 0.006 | 0.08 | 0.015 | 0 | 0.02 | 0.1 | 0 | 0.5 |
| 40 | 53.75 | 4.50 | 41.75 | 0.3 | 0.006 | 0.08 | 0.04 | 0 | 0.02 | 0.1 | 0 | 0.5 |
| *41 | 53.75 | 4.50 | 41.75 | 0.3 | 0.006 | 0.08 | 0.05 | 0 | 0.02 | 0.1 | 0 | 0.5 |
| 42 | 53.75 | 4.50 | 41.75 | 0.3 | 0.006 | 0.08 | 0 | 0.015 | 0.02 | 0.1 | 0 | 0.5 |
| 43 | 53.75 | 4.50 | 41.75 | 0.3 | 0.006 | 0.08 | 0 | 0.04 | 0.02 | 0.1 | 0 | 0.5 |
| *44 | 53.75 | 4.50 | 41.75 | 0.3 | 0.006 | 0.08 | 0 | 0.05 | 0.02 | 0.1 | 0 | 0.5 |
| 45 | 53.75 | 4.50 | 41.75 | 0.3 | 0.006 | 0.08 | 0.015 | 0.015 | 0.02 | 0.1 | 0 | 0.5 |

About the obtained magnetic core, the magnetic core loss Pcv and the saturation magnetic flux density Bs were evaluated. The evaluation method is the same as Example 1, therefore, the explanation thereof is omitted. The result is shown in Table 6. Each of the magnetic core losses of the MnZn-based ferrites of Example was low and a remarkable magnetic property was obtained.

TABLE 6

| | magnetic core loss Pcv(kW/m³) | | | | minimum temperature of magnetic core loss (° C.) | magnetic core loss at 130° C. after left in high-temperature environment (kW/m³) | rate of change Ps of magnetic core loss (%) | saturation magnetic flux density Bs at 130° C. (mT) | average crystal grain size (μm) |
|---|---|---|---|---|---|---|---|---|---|
| No. | 23° C. | 100° C. | 130° C. | 150° C. | | | | | |
| 27 | 820 | 409 | 357 | 428 | 130 | 369 | 3.4 | 410 | — |
| 28 | 824 | 451 | 389 | 463 | 130 | 397 | 2.1 | 418 | — |
| *29 | 1743 | 1164 | 994 | 1169 | 130 | 1012 | 1.8 | 420 | — |
| *30 | 1111 | 632 | 553 | 655 | 130 | 572 | 3.4 | 406 | — |
| 31 | 827 | 455 | 395 | 473 | 130 | 405 | 2.5 | 415 | — |

TABLE 6-continued

| No. | magnetic core loss Pcv(kW/m³) | | | | minimum temperature of magnetic core loss (° C.) | magnetic core loss at 130° C. after left in high-temperature environment (kW/m³) | rate of change Ps of magnetic core loss (%) | saturation magnetic flux density Bs at 130° C. (mT) | average crystal grain size (μm) |
|---|---|---|---|---|---|---|---|---|---|
| | 23° C. | 100° C. | 130° C. | 150° C. | | | | | |
| 32 | 815 | 452 | 386 | 475 | 130 | 396 | 2.6 | 413 | — |
| *33 | 1336 | 742 | 621 | 751 | 130 | 635 | 2.3 | 403 | — |
| *34 | 1075 | 512 | 406 | 544 | 130 | 407 | 0.2 | 416 | — |
| 35 | 830 | 454 | 389 | 467 | 130 | 393 | 1.0 | 417 | — |
| 36 | 651 | 422 | 399 | 441 | 130 | 417 | 4.5 | 415 | — |
| *37 | 613 | 457 | 450 | 488 | 130 | 490 | 8.8 | 413 | — |
| *38 | 725 | 493 | 432 | 501 | 130 | 445 | 3.0 | 413 | — |
| 39 | 703 | 423 | 375 | 430 | 130 | 385 | 2.7 | 415 | — |
| 40 | 894 | 397 | 351 | 403 | 130 | 359 | 2.3 | 418 | — |
| *41 | 1006 | 725 | 631 | 739 | 130 | 653 | 3.5 | 421 | — |
| 42 | 700 | 395 | 354 | 406 | 130 | 363 | 2.5 | 414 | — |
| 43 | 713 | 451 | 398 | 458 | 130 | 411 | 3.3 | 417 | — |
| *44 | 1422 | 954 | 821 | 1059 | 130 | 837 | 1.9 | 420 | — |
| 45 | 687 | 405 | 363 | 417 | 130 | 372 | 2.5 | 418 | — |

EXAMPLE 4

$Fe_2O_3$, MnO ($Mn_3O_4$ is used), ZnO, $SiO_2$, $CaCO_3$, $Co_3O_4$, $Ta_2O_5$, $Bi_2O_3$ and $TiO_2$ were weighed so as to obtain a composition shown in Table 7 as the MnZn-based ferrite. The other step conditions are the same as Example 1, therefore, the explanation thereof is omitted.

TABLE 7

| No. | $Fe_2O_3$ (mol %) | ZnO (mol %) | MnO (mol %) | $Co_3O_4$ (mass %) | $SiO_2$ (mass %) | $CaCO_3$ (mass %) | $Ta_2O_5$ (mass %) | $Nb_2O_5$ (mass %) | $Bi_2O_3$ (mass %) | $TiO_2$ (mass %) | $SnO_2$ (mass %) | $O_2$ concentration (%) |
|---|---|---|---|---|---|---|---|---|---|---|---|---|
| 46 | 53.25 | 5.50 | 41.25 | 0.16 | 0.006 | 0.08 | 0.03 | 0 | 0.02 | 0.1 | 0 | 0.5 |
| 47 | 53.25 | 6.50 | 40.25 | 0.16 | 0.006 | 0.08 | 0.03 | 0 | 0.02 | 0.1 | 0 | 0.5 |
| 48 | 53.25 | 7.50 | 39.25 | 0.16 | 0.006 | 0.08 | 0.03 | 0 | 0.02 | 0.1 | 0 | 0.5 |
| 49 | 53.25 | 8.50 | 38.25 | 0.16 | 0.006 | 0.08 | 0.03 | 0 | 0.02 | 0.1 | 0 | 0.5 |
| 50 | 53.75 | 3.50 | 42.75 | 0.16 | 0.006 | 0.08 | 0.03 | 0 | 0.02 | 0.1 | 0 | 0.5 |
| 51 | 53.75 | 4.50 | 41.75 | 0.16 | 0.006 | 0.08 | 0.03 | 0 | 0.02 | 0.1 | 0 | 0.5 |
| 52 | 54.00 | 2.50 | 43.50 | 0.16 | 0.006 | 0.08 | 0.03 | 0 | 0.02 | 0.1 | 0 | 0.5 |
| 53 | 54.00 | 3.50 | 42.50 | 0.16 | 0.006 | 0.08 | 0.03 | 0 | 0.02 | 0.1 | 0 | 0.5 |
| *54 | 53.75 | 9.50 | 36.76 | 0.16 | 0.006 | 0.08 | 0.03 | 0 | 0.02 | 0.1 | 0 | 0.5 |
| *55 | 53.75 | 1.50 | 44.75 | 0.16 | 0.006 | 0.08 | 0.03 | 0 | 0.02 | 0.1 | 0 | 0.5 |
| *56 | 52.75 | 5.50 | 41.75 | 0.16 | 0.006 | 0.08 | 0.03 | 0 | 0.02 | 0.1 | 0 | 0.5 |
| *57 | 54.25 | 2.50 | 43.25 | 0.16 | 0.006 | 0.08 | 0.03 | 0 | 0.02 | 0.1 | 0 | 0.5 |

About the obtained magnetic core, the magnetic core loss Pcv and the saturation magnetic flux density Bs were evaluated. The evaluation method is the same as Example 1, therefore, the explanation thereof is omitted. The result is shown in Table 8.

TABLE 8

| No. | magnetic core loss Pcv(kW/m³) | | | | minimum temperature of magnetic core loss (° C.) | magnetic core loss at 130° C. after left in high-temperature environment (kW/m³) | rate of change Ps of magnetic core loss (%) | saturation magnetic flux density Bs at 130° C. (mT) | average crystal grain size (μm) |
|---|---|---|---|---|---|---|---|---|---|
| | 23° C. | 100° C. | 130° C. | 150° C. | | | | | |
| 48 | 908 | 463 | 386 | 384 | 150 | 393 | 1.8 | 396 | — |
| 47 | 811 | 423 | 377 | 420 | 130 | 384 | 1.8 | 392 | — |
| 48 | 707 | 365 | 366 | 464 | 120 | 371 | 1.4 | 387 | — |
| 49 | 569 | 300 | 386 | 488 | 110 | 390 | 1.2 | 385 | — |
| 50 | 886 | 436 | 354 | 372 | 120 | 366 | 3.3 | 420 | — |
| 51 | 896 | 370 | 335 | 446 | 120 | 342 | 2.1 | 417 | — |
| 52 | 946 | 425 | 356 | 421 | 130 | 373 | 4.6 | 422 | — |
| 53 | 870 | 348 | 338 | 478 | 120 | 351 | 3.9 | 420 | — |
| *54 | 338 | 629 | 737 | 759 | 40 | 743 | 0.9 | 378 | — |
| *55 | 1165 | 605 | 458 | 388 | 150< | 486 | 6.1 | 407 | — |
| *56 | 1221 | 666 | 545 | 516 | 150 | 552 | 1.3 | 390 | — |
| *57 | 827 | 375 | 434 | 608 | 110 | 458 | 5.5 | 423 | — |

Each of magnetic core losses of the MnZn-based ferrites of Example was low and a remarkable magnetic property was obtained. A temperature at which the magnetic core loss Pcv was the minimum varied according to composition amounts of $Fe_2O_3$, MnO and ZnO, and a minimum temperature of the magnetic core loss ranged from 110° C. to 150° C. in Example, but it was 40° C. in No. 54 of the comparative example and it was a temperature over 150° C. in No. 55 of the comparative example.

It is to be noted that, as used herein and in the appended claims, the singular forms "a", "an", and "the" include plural referents unless the context clearly dictates otherwise.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A MnZn-based ferrite containing Fe, Mn and Zn as a main component and containing Si, Ca, Co and Bi, and at least one of Ta and Nb, and at least one of Ti and Sn as a sub component,
   wherein given that a total amount is 100 mol % when the main component includes $Fe_2O_3$, ZnO and MnO respectively, Fe ranges from 53.25 mol % or more to 54.00 mol % or less on the basis of $Fe_2O_3$, Zn ranges from 2.50 mol % or more to 8.50 mol % or less on the basis of ZnO and Mn is the remainder on the basis of MnO,
   wherein Si ranges from more than 0.001 mass % to less than 0.02 mass % on the basis of $SiO_2$, Ca ranges from more than 0.04 mass % to less than 0.4 mass % on the basis of $CaCO_3$, Co is less than 0.5 mass % (zero is not contained) on the basis of $Co_3O_4$, Bi is less than 0.05 mass % (zero is not contained) on the basis of $Bi_2O_3$, Ta is less than 0.05 mass % (zero is contained) on the basis of $Ta_2O_5$, Nb is less than 0.05 mass % (zero is contained) on the basis of $Nb_2O_5$, Ti is less than 0.3 mass % (zero is contained) on the basis of $TiO_2$, and Sn is less than 0.3 mass % (zero is contained) on the basis of $SnO_2$, and note that the converted total amount of $Ta_2O_5$ and $Nb_2O_5$ is less than 0.05 mass % (zero is not contained) and the converted total amount of $TiO_2$ and $SnO_2$ is less than 0.3 mass % (zero is not contained), and
   wherein at a frequency of 100 kHz in a maximum magnetic flux density of 200 mT, a magnetic core loss (Pcv130A) at 130 ° C. is 400 kW/m³ or less, and a rate of change Ps of the magnetic core loss is 5% or less that is expressed in the following formula using the magnetic core loss (Pcv130B) at 130 ° C. after maintaining the MnZn-based ferrite at 200 ° C. for 96 hours, Ps (%) =[(Pcv130B−Pcv130A)/Pcv130A]×100.

2. The MnZn-based ferrite according to claim 1, wherein Si ranges from 0.003 mass % or more to 0.015 mass % or less on the basis of $SiO_2$, Ca ranges from 0.06 mass % or more to 0.3 mass % or less on the basis of $CaCO_3$, Co ranges from 0.16 mass % or more to 0.4 mass % or less on the basis of $Co_3O_4$, and Bi ranges from 0.0075 mass % or more to 0.04 mass % or less on the basis of $Bi_2O_3$, and in a case where Ta or Nb is contained independently, Ta ranges from 0.015 mass % or more to 0.04 mass % or less on the basis of $Ta_2O_5$ or Nb ranges from 0.015 mass % or more to 0.04 mass % or less on the basis of $Nb_2O_5$, and in a case where Ti or Sn is contained independently, Ti ranges from 0.02 mass % or more to 0.2 mass % or less on the basis of $TiO_2$ or Sn ranges from 0.02 mass % or more to 0.2 mass % or less on the basis of $SnO_2$, and in a case where both of Ta and Nb are contained, the converted total amount of $Ta_2O_5$ and $Nb_2O_5$ ranges from 0.015 mass % or more to 0.04 mass % or less, and in a case where both of Ti and Sn are contained, the converted total amount of $TiO_2$ and $SnO_2$ ranges from 0.02 mass % or more to 0.2 mass % or less.

3. The MnZn-based ferrite according to claim 2, wherein the magnetic core loss between 100° C. and 150 ° C. is 500kW/m³ or less and the minimum temperature of the magnetic core loss ranges from 110 ° C. to 150 ° C.

4. The MnZn-based ferrite according to claim 3, wherein the magnetic core loss (Pcv130B) at 130 ° C. after maintaining the MnZn-based ferrite at 200 ° C. for 96 hours is 400 kW/m³ or less.

5. The MnZn-based ferrite according to claim 1, wherein the magnetic core loss between 100° C. and 150 ° C. is 500 kW/m³ or less and the minimum temperature of the magnetic core loss ranges from 110 ° C. to 150 ° C.

6. The MnZn-based ferrite according to claim 5, wherein the magnetic core loss (Pcv130B) at 130° C. after maintaining the MnZn-based ferrite at 200 ° C. for 96 hours is 400 kW/m³ or less.

7. A method for manufacturing a MnZn-based ferrite, comprising:
   a calcination step of molding an oxide powder of the main component and the sub component specified in claim 1 to obtain a molded body and calcinating the molded body,
   wherein the calcination step includes a temperature rising step, a high temperature maintaining step and a temperature falling step,
   wherein a temperature at the high temperature maintaining step ranges from 1250° C. to 1400 ° C., and an oxygen concentration in an atmosphere at the high temperature maintaining step is 0.7% or less in a volume percent, and
   wherein an oxygen concentration at 1200 ° C. is 0.5% or less and an oxygen concentration at 1100 ° C. is 0.1% or less at the temperature falling step.

* * * * *